United States Patent [19]

Nickel

[11] Patent Number: 5,383,247
[45] Date of Patent: Jan. 24, 1995

[54] WASHING INSTALLATION FOR WINDSHIELDS OR MOTOR VEHICLES, AIRCRAFT, LOCOMOTIVES OR THE LIKE

[75] Inventor: Klaus D. Nickel, Frankfurt am Main, Germany

[73] Assignee: Citadel Inventments Limited, St. Helier, United Kingdom

[21] Appl. No.: 952,545

[22] PCT Filed: Apr. 8, 1992

[86] PCT No.: PCT/EP92/00793

§ 371 Date: Dec. 11, 1992

§ 102(e) Date: Dec. 11, 1992

[87] PCT Pub. No.: WO92/18360

PCT Pub. Date: Oct. 29, 1992

[30] Foreign Application Priority Data

Apr. 12, 1991 [DE] Germany .............. 4111937

[51] Int. Cl.6 .......... B60S 1/52; B60S 1/46; B60S 1/38
[52] U.S. Cl. .............. 15/250.04; 15/250.02; 15/250.01; 15/250.36; 15/250.42; 239/130; 239/284.1; 15/250.05; 165/41; 237/12.3 R
[58] Field of Search .......... 15/250.01, 250.02, 250.03, 15/250.04, 250.05, 250.06, 250.07, 250.08, 250.09; 165/41; 239/284.1, 284.2, 130, 135, 566; 237/12.3 R, 12.3 A, 12.3 B

[56] References Cited

U.S. PATENT DOCUMENTS

| | | | |
|---|---|---|---|
| 2,576,198 | 11/1951 | Stuart | 239/284.1 |
| 2,865,830 | 12/1958 | Zoldas | 239/566 |
| 3,371,368 | 3/1968 | Walker | 15/250.04 |
| 3,591,887 | 7/1971 | Keddie | 15/250.02 |
| 4,090,668 | 5/1978 | Kochenour | 15/250.04 |
| 4,177,928 | 12/1979 | Bergkvist | 239/284.2 |
| 4,832,262 | 5/1989 | Robertson | 15/250.01 |

FOREIGN PATENT DOCUMENTS

| | | | |
|---|---|---|---|
| 2197360 | 3/1974 | France . | |
| 2252749 | 6/1975 | France . | |
| 2003912 | 8/1971 | Germany | 15/250.04 |
| 2115600 | 10/1972 | Germany | 239/284.2 |
| 2133270 | 1/1973 | Germany . | |
| 3134083 | 3/1983 | Germany | 15/250.04 |
| 8312248 | 4/1983 | Germany . | |
| 8503691 | 2/1985 | Germany . | |
| 3708719 | 10/1988 | Germany . | |
| 427534 | 6/1967 | Switzerland | 15/250.04 |
| 2038169 | 7/1980 | United Kingdom . | |

Primary Examiner—David A. Scherbel
Assistant Examiner—Gary K. Graham
Attorney, Agent, or Firm—Anderson Kill Olick & Oshinsky

[57] ABSTRACT

The invention deals with a cleaning installation for windshields of motor vehicles, aircraft, locomotives or the like with at least one wiper arm drivable by a wiper motor, at which arm a wiper blade is fastened by means of wiper blade holders, with a channel provided with outlet apertures extending in said blade, which is connected by a supply line to a water reservoir of a windshield washer installation connected to a pump, wherein the region of the wiper blade (9, 21) pointing towards the windshield (2) is part of the channel wall (11, 23) into which the outlet apertures (12) are mortised, and where a wiper lip (15) is disposed between the outlet apertures (12) by means of a swivel strip (14, 24) or a wiper lip (25) is arranged on each side, wherein selectively water, warm water or steam can exit from the outlet apertures (12)

14 Claims, 5 Drawing Sheets

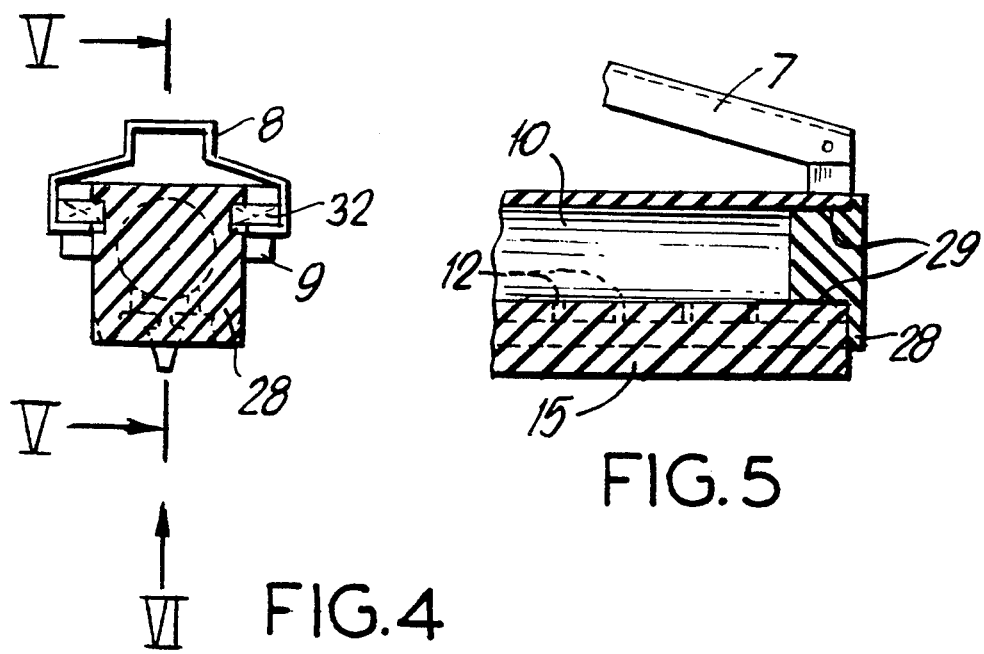
FIG.4
FIG.5
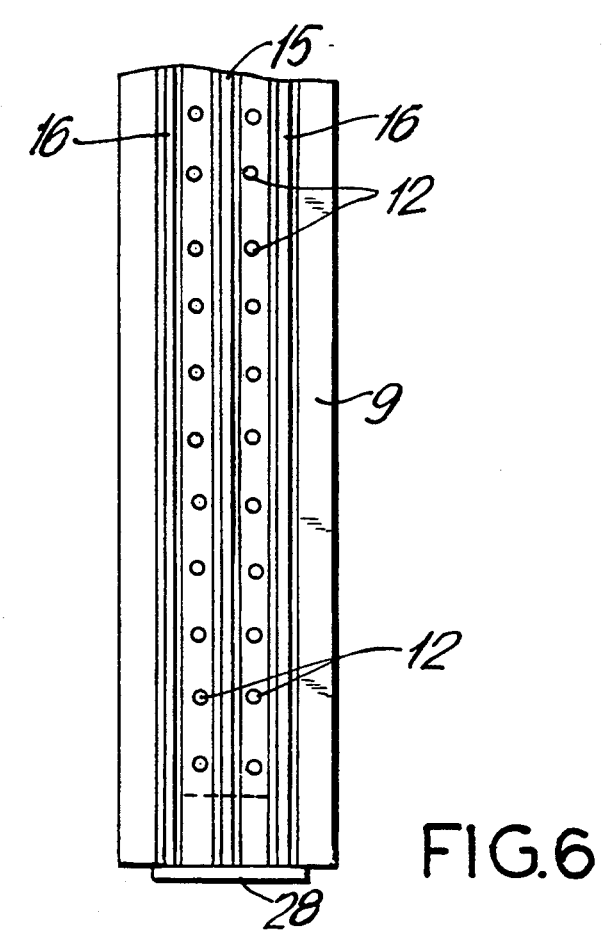
FIG.6

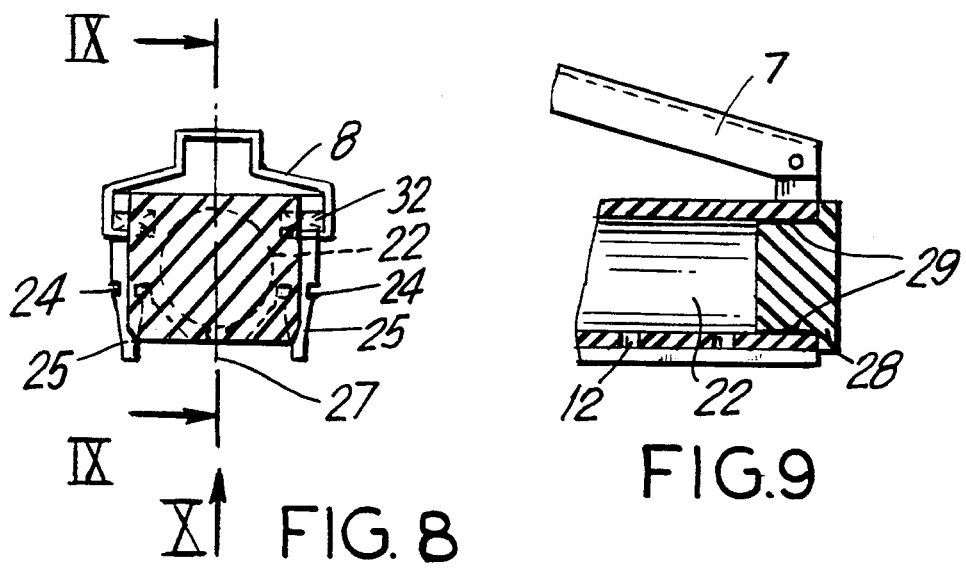
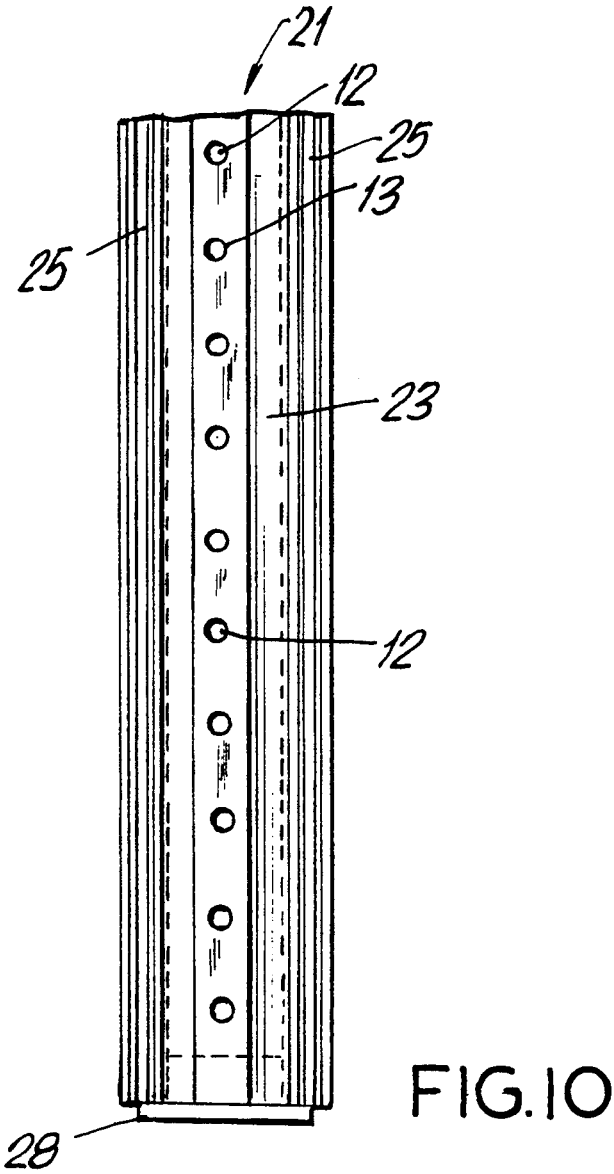

WASHING INSTALLATION FOR WINDSHIELDS OR MOTOR VEHICLES, AIRCRAFT, LOCOMOTIVES OR THE LIKE

BACKGROUND OF THE INVENTION

The invention deals with a washing installation for windshields of motor vehicles, aircraft or locomotives or the like with at least one wiper arm drivable by a wiper motor, at which a wiper blade is fastened by means of wiper blade holders, in which blade a channel provided with outlet apertures extends, which is connected by a supply line with a water container of a windshield washing installation connected to a pump.

Such washing installations have been mandatory and prescribed for many years for cleaning of windshields. Essentially they have also mostly proved themselves. In rain or dusty weather they clean the more or less dirtied windshield. The glass plate of headlights can also be equipped with such cleaning installations.

The water or a cleaning liquid in most cases is sprayed upon the windshield by means of a spray nozzle. In order to generate the required operational pressure, a pump is provided between the water reservoir and the spray nozzle.

So as to direct the water optimally upon the windshield, it has become known to use two wiper blades essentially arranged next to each other by means of a holder disposed at the wiper arm, in between which the spray nozzle for the water is located (DE-GM 39 11 930).

This indeed prevents that the water required for cleaning a dirty windshield is scattered or pulverized for instance by the head wind in such a way, that an adequate quantity is not available at the windshield. However, it was seen that solely by the orientation of the water jet in connection with two wiper blades and optimum washing of a dirty windshield was not possible.

Above all lately the dirt does not consist only of dust, rather, mainly in summer and fall, from insect residues and throughout the whole year from a lubricant- or grease-film, which is caused mainly by oil contaminations on the road and by abrasion of the tires. The cleaning power of the known windshield washer is unable to deal with it.

A windshield washer with insect- and dirt remover has become known in order to mainly remove insect residues and other dirt from the windshield of the type under discussion, where the windshield wiper or the windshield wiper arm is provided with at least one wiper blade (for instance, rubber section) from at least one insect- and dirt remover in a randomly appropriate arrangement with respect to each other which in the overall arrangement preferably forms one single unit. In one particular embodiment example the windshield wiper, the windshield wiper blade (for instance rubber-lip among other) and/or the plurality of insect- and dirt removers are equipped with channels and outlet apertures for application of liquid and/or gaseous media. The insect- and dirt-removers consist of sponge-, brush-, wipeoff strips, or other expedient elements or parts (DE-OS 27 00 527).

It is disadvantageous that the insect- and dirt removers for instance made from hard sponges which are in use get dirty relatively easily and must be replaced. They are also prone to rapid aging because of the material. Due to solar radiation, which normally impacts these windshield washers head on, the hard rubber becomes very quickly brittle even if it is elastic to begin with. The chemical cleaning agent additionally used in preferred embodiment examples of the known windshield washers, with which chitin residues of insects as well as also the oil- or grease film is to be removed, is necessarily configured in such a way that thereby the rubber mounting of the windshield principally however also the lacquer on the body is sooner or later damaged. Even if the shield glass pane can be cleaned by coaction of the known mechanical and chemical cleaning agents, the disadvantages involved therein are so weighty, that such windshield washers do not find any acceptance.

The invention is meant to achieve a refinement or improvement of such a windshield wiper. Even with all imaginable improvements of the design details, the useful life of the mechanical cleaning agents is not improved and the detrimenal influence on the rubber-like windshield mounting and the body lacquer will not be avoided.

SUMMARY OF THE INVENTION

Contrary to that the present invention travels along a different path. It is based upon the task to further refine a cleaning installation of the type described above in such a way, that it enables the removal of insect residues as well as of lubricant- and grease film from the respective windshields, without having to use special mechanical means or chemical products for this purpose, which would attack the glass pane mounting or the lacquer of the motor vehicle.

The task of the invention is solved by providing a cleaning or washing installation, in which a portion of the wiper blade pointing toward the windshield is a part of a channel wall to which a wiper lip is attached by a swivel strip, with the outlet apertures being mortised into this channel wall part on opposite sides of the wiper lip, or which portion has two wiper lips arranged at opposite edges of the channel wall part into which the outlet apertures are mortised.

The invention makes it possible for the first time to remove oil films or insect residues from windshields without special additional trouble-prone mechanical cleaning agents or chemicals. The wiper blades of the new cleaning installation are subject only to normal ageing phenomena. Tests have shown that the new wiper blades remove dirt from the windshield in a more satisfactory manner than conventional windshield cleaning installations. Surprisingly good cleaning results, above all on windshields contaminated by a dirt film or by insect residues, are obtained however through the use of warm water or steam. Thus at a steam temperature of approximately 120° C. and a steam pressure of between 2 and 2.5 bar there results not only heating of the windshield, rather above all also a dissolution of chitin residues and a detachment of the grease- or dirt film from the windshield. The windshield is heated by the steam, which permits elimination of streak formations which especially at night interfere with one's sight. The dangerous grease- and dirt film can be also dissolved by action of steam, which film accumulates especially upon following a truck. Because the new cleaning installation as also the previously known cleaning installations can be operated by water from the water reservoir, the invention permits to additionally assist the shield cleaning caused by the jet of steam by water mist sprayed upon the windshield in a targeted manner or however also by condensation of the cleaning steam.

A particularly effective configuration of the windshield wiper results from disposing boundary lips on both sides of the wiper lips of the wiper blade, whose height is less than the height of the wiper lips and by disposing there the outlet apertures respectively between the wiper lips and one of the boundary lips.

It is important that the outer wall of the feed channel pointing towards the windshield as well as respectively one side wall of the wiper lip and one internal wall of a boundary lip define a cleaning space standing upon a strip of the glass. This essentially closed cleaning space is one of the preconditions for the particularly good cleaning action. It holds the cleaning water longer in the cleaning region but also concentrates the cleaning steam during the steam cleaning phase initiatable by a switch. Herein the outlet apertures for water or steam along the respectively ineffective side of the wiper lip are kept closed depending upon the direction of motion of the wiper blades.

In the second embodiment example the wiper blade has two wiper lips 5. This makes it possible to configure the water- or steam- or steam condensation space larger than in the first embodiment example in order to better wash large windshield glass panes.

The invention does not deal with hitherto known cleaning installations and their drive units, by means of which the wiper motion of the wiper blades is produced through a wiper linkage. The adjustment of different wiper speeds for instance between 50 and 70 reciprocating movements per minute are also not touched by the invention. The new cleaning installation can also be provided with an automatic limit stop, by means of which the wiper blades return immediately to their neutral position after being switched off or do this after several wiper motions.

The cleaning installation in the invention can also include the known water nozzle, which is connected in the usual manner with the water reservoir, if for reasons of safety no hot water is being sprayed!

The invention permits to set up random combinations between water- and/or steam cleaning phases. Before a steam jet cleaning the glass can therefore to begin with be moistened with water. The invention also permits to perform this moistening operation with already warmed-up water (maximum temperature 60°), while observing the safety precautions. The water rapidly cools for instance on the windshield glass, whereby however an initial cleaning or wash effect is achieved. The slightly preheated dirty windshield glass is intensively and permanently cleaned by the steam jet cleaning operation. After that a water rinse with warm or cold water can occur. The electrical circuit layout can be structured in such a way, that the respectively desired functional modes are set up by the function switch and are switched on by an additional on-off switch.

BRIEF DESCRIPTION OF THE DRAWINGS

Embodiment examples of the invention are explained in the following with the help of the drawing.

It is shown on:

FIG. 10 a front view of the bottom side of the wiper blade along the arrow X in FIG. 8 and FIG. 11 a diagrammatic overview of the windshield wiper installation.

DETAILED DESCRIPTION OF THE PREFERRED EMBODIMENT

Figure 1:
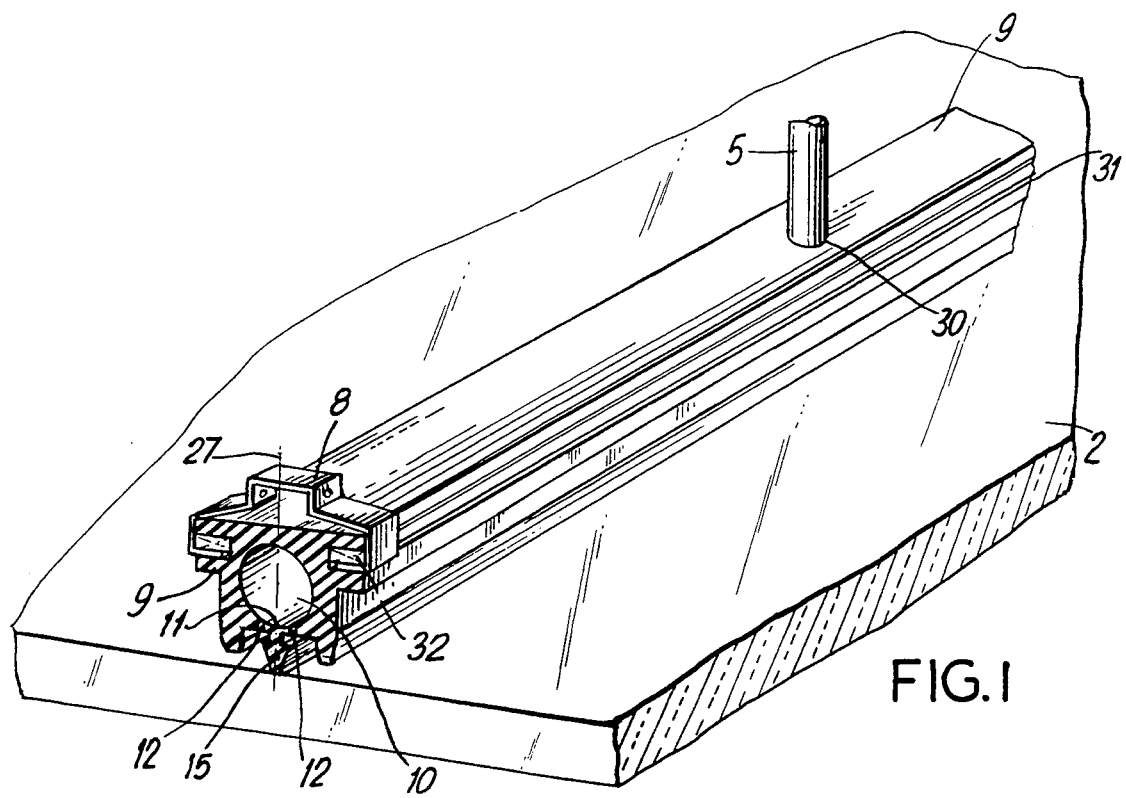
FIG. 1 a sectional view of a first wiper blade in perspective.

FIGS. 1 to 6 show a first embodiment example of a wiper blade 8 for a cleaning and washing installation for windshield panes 2 in motor vehicles, aircraft or locomotives or the like with at least one wiper motor 3, which drives a wiper arm 4 in a known manner; this windshield washer installation is shown only diagrammatically in FIG. 1. The wiper blade 9 is connected to said wiper arm in a known manner by plug-in connectors 6, wiper blade holders and clamping brackets.

Channel 10 provided with outlet apertures 12 extends in longitudinal direction in this wiper blade 9 which is in connection through a supply line 5 and the pump 35 with a water reservoir 34.

The cleaning installation 1, above all the windshield washers 33 are described in the following embodiments.

The wiper blade 9 is symmetrical with respect to a central longitudinal plane 27. It consists of the usual known material which is disposed around the channel 10. A planar surface points towards the wiper arm 4 in the embodiment example shown. Longitudinal grooves 31 for receiving contact pressure springs 32 and the inwardly bent ends of the clamping brackets 8 are provided on both side edge regions which follow towards the windshield glass 2. The channel 10 is closed in direction of the windshield by a channel wall 11, from which projects a swiveling strip 14 which is symmetric to the central longitudinal plane 27 with the wiper lip 15 being seated on said swiveling strip 14. On both sides of this wiper lip 15 outer apertures 12 are provided in the channel wall 11.

The channel wall 11 is bounded by boundary lips 16 on both sides of the wiper lip 15. The height 150 of wiper lip 15 and swivel strip 14 is greater than the height 150 of the boundary lips. The outlet apertures 12 extend in two rows in the channel wall 11, which are respectively arranged between the wiper lip 15 and one of the boundary lips 16.

Figure 2:
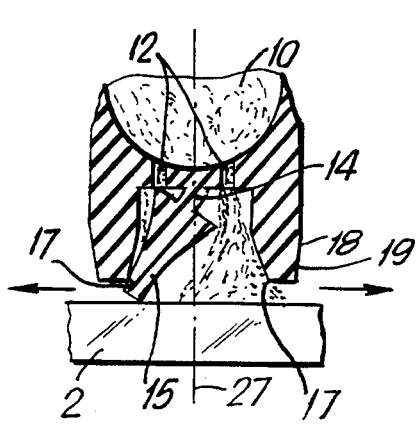
FIG. 2 a sectional view through the bottom region of a wiper blade in FIG. 1 in operational condition, FIG. 3 a section drawing of the bottom region of the wiper blades in FIG. 1 in neutral position, FIG. 4 an end view of the wiper blade, FIG. 5 a section through FIG. 4 along the arrows V—V, FIG. 6 a front view from the bottom upon the wiper blade along the arrow VI in FIG. 4, FIG. 7 a partial cutout of a second wiper blade in the invention in perspective, FIG. 8 an end view of the wiper blade in FIG. 7, FIG. 9 a section along the line IX—IX in FIG. 8.
Figure 3:
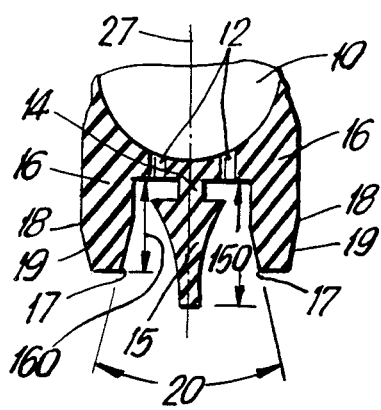

The swivel strip 14 is designed in such a way, as can be seen mainly from FIGS. 2 and 3, that the wiper lip has a swivel angle or range 20 when the wiper blade 9 is in motion, this angle being limited by the inner edges 17 of the boundary lips 16. The inner edges 17 can be provided with chamfers just as the outer edges 18 of the boundary lips 16.

As can be seen mainly in FIG. 2 the cross-section of the wiper lip 15 is shaped like a triangle. The base follows upon the swivel strip 14 in such a way, that regions are formed on both sides of the swivel strip 14, which, depending upon the direction of motion, act as blockages for the outlet apertures 12 disposed in a row, wherein the outlet apertures located on the opposite side of the swivel strip 14 are exposed or opened. The side walls of the sealing lip 15 designed in a slightly arcuate manner together with the respective inner edges 17 of the boundary lips 16 constitute herein a second blockage. Because of this and due to the described obduration of the outlet apertures 12 in the left row in FIG. 3 the liquid or as will be explained later the steam exits without any impediments from the outlet apertures 12 in the right hand row in FIG. 2. Herein the wiper blade 9 moves toward the right and the wiper lip swivels leftward. Water and steam arrive herein in wiping direction always upstream of the wiper lip 15 whereby not only an optimum cleaning effect is achieved, rather also a useless pulverization of the water or the steam is avoided.

When the wiper blade 9 moves in the opposite direction, in FIG. 2 towards the left side, the process described is repeated, wherein the outer apertures 12 of the right hand row are closed and the outer apertures of the left hand row are completely opened.

The dimensions of the channel 10, the heights 150 and 160 as well as the diameters 13 of the outlet apertures 12 are matched in such a way to each other, that the described water-or steam exit operates in an optimum manner in each set-up wiper speed. In order to increase the effectiveness, the steam- or water pressure can be matched in such a way by means of sensor controls to the vehicle traveling speed, that an optimum cleaning is assured.

FIG. 1 shows that the supply line 5 is connected through a junction 30 to the channel 10. The end of the supply line 5 can be glued to the junction 30.

FIGS. 4 and 5 show the end of a wiper blade 9 in plan view and in section along line V—V in FIG. 4. The channel 10 is closed off by a closure piece or end plug 28, which is for instance glued by adhesive points 29 to the inner wall at the end of the channel 10.

FIG. 6 shows a front view from below upon the wiper blade 9 in direction of arrow VI in FIG. 4. The spacing of the outlet apertures 12 within the row is determined experimentally. In order to compensate for an eventual pressure drop of the cleaning agent inside of the channel 10, the diameter 13 of the outlet apertures 12 between the junction 30 and the closure pie 28 can correspondingly increase.

FIGS. 7 to 10 show a second embodiment example of a wiper blade. This wiper blade 21 consists also of material usual for wiper blades and known as such. The wiper blades in both embodiment examples can be relatively easily manufactured in an extrusion process with appropriately-shaped outlets of the die apertures.

The end of the supply line 5 is connected with the channel 22 by means of junction 30 in the upper planar surface of the wiper blade 21, which channel as also the entire wiper blade 21 is configured to be symmetrical with respect to the central longitudinal plane 27. Outlet apertures 12 are mounted in the channel wall 23 pointing towards the windshield 2, which in the example shown are disposed along the line lying in the central longitudinal plane.

Figure 7:
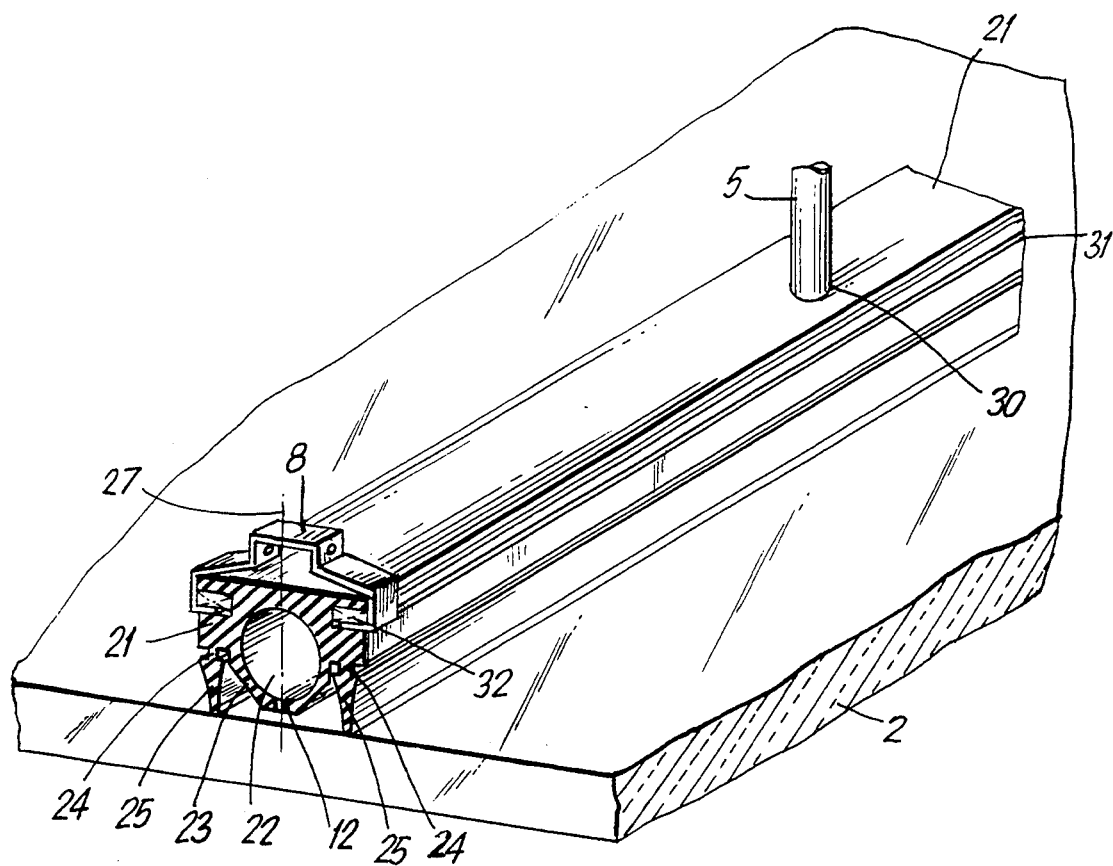

The channel wall 23 is bounded on the side by wiper lips 25, which are fastened by swivel strips 24 along the edge regions of the channel wall 23. FIG. 7 shows a space for water or steam is defined by the inner walls of the wiper lips 25, the channel wall 23 and a corresponding strip of the windshield 22 located opposite the channel wall; this space permits an optimum wetting of the windshield during movement of the wiper blade 21 without the water or the steam being impeded by the head wind.

FIGS. 8, 9 and 10 show analogously to FIGS. 4, 5 and 6 in the first embodiment example, that the channel 22 is also closed off by a closure piece or end plug 28. In the second embodiment example the closure piece 28 can also be glued by means of an adhesive 29 to the inner wall of the end of channel 22. The arrangement of the outlet apertures 12 is shown only by way of an example in FIG. 10. The spacing of the outlet apertures 12 along the sectional line between the central longitudinal plane 27 and channel wall 23 can vary. Without affecting the core of the invention, the outlet apertures 12 can also be distributed in the channel wall 23 in an other expedient arrangement. Longitudinal grooves 31 known as such for contact pressure springs 34 and for receiving the bent ends of the clamping bracket 8 are also provided along the upper regions of the side walls of the wiper blade 21.

In both embodiment examples the supply line 5 runs along the wiper arm 4. The front end of the supply line 5 is conducted beneath a plug-in connection 6 between the wiper arm 4 and the wiper blade retainer 7 to the junction 3 of the channel 10 or 22 within the wiper blade 9, 21. The end of the supply line 5 can be glued to the junction 30.

As already mentioned water as well as steam can be supplied to the channels 10 and 33 through the supply line 5. In order to make this possible the supply line 5 can in both embodiment examples of the wiper blades be connected to a windshield washer installation 33 shown diagrammatically in FIG. 11. This is however not strictly necessary. The new wiper blades 9 and 21 can also be used in a conventional windshield wiper installation.

Figure 11:
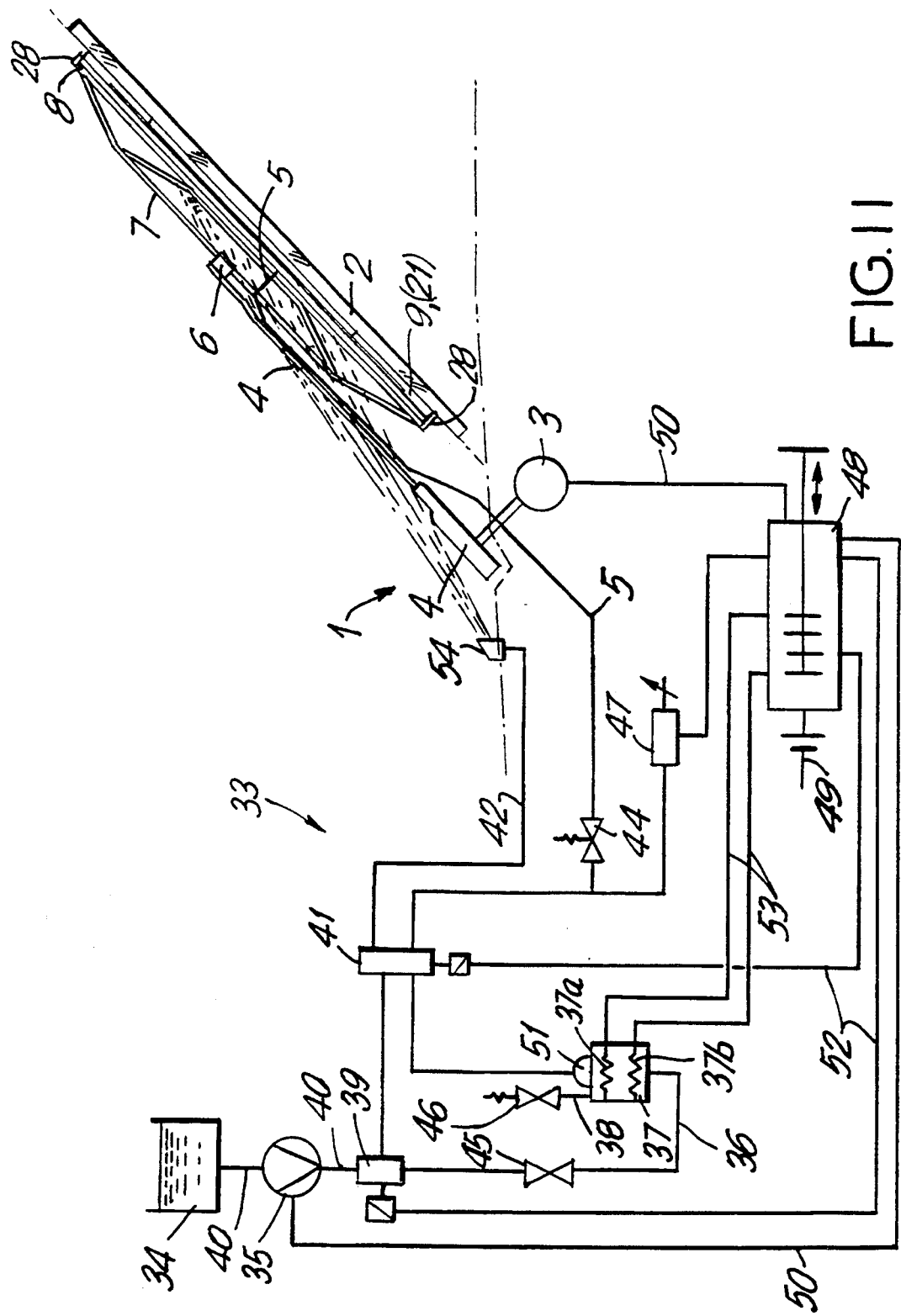

The windshield washer installation 33 in FIG. 11 contains a water reservoir 34 connected to a pump 35 through a water line 40, the pump being in effective electrical connection with a switching- and control-element 48 through a line 50. The outlet of the pump 35 is connected to a first reversing valve 39, which is connected electrically through a control line 52 to the switching- and control-element 48. The pump can be either directly connected by the first reversing valve 39 to a second reversing valve 41 or can be connected with said reversing valve 41 through a water supply line 36 with a check valve 45, an evaporator 37 and a steam space 51 and a steam line 38, with the second reversing valve 41 being connected through a control line 52 with the switching- and control-element 48. An first outlet of the second reversing valve 41 is directly connected through a first water line 42 to a spray nozzle 54, whereas the second outlet is connected through a pressure control valve 44 to the supply line 5 for the wiper blade 9, 21. As it follows from the foregoing description of the construction of the second reversing valve 41, with the switch-off evaporator 37, cold water flows from the first reversing valve 39, directly to the valve 41 and from its first outlet to the nozzle 54. With the switch-on evaporator 37, the valve 41 is reversed, and hot water or steam flows from its second outlet to the supply line 5. A line to a pressure switch 47 branches off upstream of the pressure control valve 44, which on its part is connected to the switching-control element 48 which is also connected to the wiper motor 3 through a line 50.

The evaporator 37 is protected by a safety pressured relief valve 46 and is equipped with a heating member 37a for heating the water to approximately 60° C. and a second heating member 37b for evaporating the water. Both heating members 37a, 37b are in circuit connection through sensors by heating member supply lines 53 to the switching- and control-element 48.

The evaporator 37 can be equipped with a flow-through heater, which, after the first heating member 37a has been switched on, heats the water conveyed by the pump 35 to approximately 60° C and which evaporates the preheated water after the second heating member 37b has been additionally switched on. In the steam space 51 of the evaporator 37 an additional heater with a stronger heating member can be disposed, which makes steam immediately available in case of necessity, if it is switched on.

As is outlined in FIG. 11. the switching- and control-element 48 is connected to the motor vehicle battery 49 through appropriate circuit breakers.

The heating members 37a and 37b are shown to be electric heaters in FIG. 11. This is the usual type of construction. Without affecting the core of the invention, it is however also possible to use heating members in the evaporator 37 which analogously to aircraft heating are heated by exhaust gases.

The wiper motor 3 can be switched-on simply in a manner known as such however not shown in connection with the present invention. Numerous switches and circuits exist for this purpose, which can also be combined with switching in stages, an automatic switch-off and a return of the windshield wiper arm to its original position. Furthermore the timewise limited switching possibilities of the water supply to the spray nozzle 54 known for a long time are furthermore not shown here, which can also be easily used for supply of water through the second reversal valve 41 in the supply line 5.

Switching and control elements which permit to manually initiate or trigger simple and complicated switching- and control-processes in motor vehicles have been known for a long time. Such known elements can be used individually or also in combination with the present invention. For this reason the switching- and control-element 48 in FIG. 1 has only been shown diagrammatically. The specialist is very well able to select or combine those items from the multitude of switching- and control-elements, by means of which the following switching- or control-conditions can be set up or be sequenced in a simple manner:

Circuit condition I: Normal operation of the wiper motor

Circuit condition II: Accelerated operation of the wiper motor

Circuit condition III: Normal or accelerated operation of the wiper motor with supply of water through the second reversing valve 41 into the supply line 5 with automatic switch-off of the water Circuit condition IV: Normal or accelerated operation of the wiper motor with water supply through the second reversing valve 41 to the spray nozzle 54 through the water line 42 with automatic switch-off of the water Circuit condition V: Normal or accelerated operation of the wiper motor with switched-on first heating member 37a in the evaporator 37 and supply of 60° C. warm water through the second reversing valve 41 into the supply line 5 with automatic switch-off of the water Circuit condition VI: Both heating members 37a and 37b in the evaporator 37 are switched on and steam is supplied through the second reversal valve 41 into the supply line 5, the normal or accelerated operation of the wiper motor is switched on by the pressure switch 47 and the switching- and control-element 48 as well as automatic switch-off of the steam.

Circuit condition VII: The quick evaporator in the steam space 51 of the evaporator 37 is switched on and steam is supplied through the second reversing valve 41 into the supply line 5. The normal or accelerated operation of the wiper motor 3 is switched on by the pressure switch 47 and the switching- and control-element 48 as well as automatic switch-off of the steam.

The circuit can also be configured in such a way that the respectively desired circuit condition can be preselected by a selection key and be triggered by operating an on-off key.

Tests have shown that depending upon the type of the windshield dirt accumulation good results can be achieved if the water temperature upon entry into the channel 10 or 21 amounts to approximately 60° C. The water is cooled on the glass, whereby in many cases an adequate cleaning of the windshield glass is made possible.

For grease and dirt accumulation upon the windshield glass due to an oil film, principally however to insect residues, a steam temperature of approximately 120° C. is necessary. The condensing steam upon the windshield guarantees smooth sliding of the wiper blades on the surface of the glass.

Without leaving the core of the invention the windshield washer installation 33 shown in FIG. 11 can also be combined with additional possibilities of cleaning- and anti-freeze-agents.

I claim:

1. A washing installation for windshields of motor vehicles, aircraft and locomotives, said washing installation comprising:

a wiper arm;

a motor connected to said wiper arm for driving same;

a wiper blade having a central longitudinal plane and a predetermined length, attachable to said wiper arm, and including a channel having outlet apertures;

retainer means for attaching said wiper blade to said wiper arm;

a water reservoir having a pump; and a supply line for connecting said wiper blade channel to said water reservoir;

wherein said wiper blade further includes a wiper blade portion facing a windshield, forming a part of a wall of said channel into which said outlet apertures are mortised, a wiper lip extending from said blade portion in the central longitudinal plane of the wiper blade, two boundary lips projecting from said blade portion toward the windshield along opposite side surfaces of said wiper lip, said two boundary lips having respective inner side surfaces which define, with respective opposite side surfaces of said wiper lip, respective substantially closed cleaning spaces on the windshield, and said wiper blade further including a swivel strip extending in the central longitudinal plane of said wiper blade for connecting said wiper lip to said channel wall part; and wherein said wiper lip has substantially a shape of a triangle with said swivel strip being connected to a base of said triangle, said triangle base having, on opposite sides of said swivel strip, portions, which form first means for blocking respective outlet apertures upon swivelling of said wiper lip in respective directions, and wherein said side surfaces of said wiper lip are defined by slightly concave side surfaces of said triangle, which have edge regions remote from said base and engaging respective inner edges of respective boundary lips, upon swivelling of said wiper lip in the respective directions, said edge regions of said concave side surfaces and said inner edges forming together second means for blocking flow from respective spaces defined betweens said side surfaces of said wiper lip and said inner side surfaces of said boundary lips.

2. A washing installation according to claim 1, wherein said inner edges are defined by chamfered portions of said inner side surfaces of said boundary lips.

3. A washing installation according to claim 1, further comprising sealing plugs for closing opposite ends of said channel.

4. A washing installation according to claim 3, wherein said supply line is connected intermediate said opposite ends of said channel, and diameters of said outlet apertures increase, from a juncture of said supply line with said channel, to said opposite ends.

5. A washing installation according to claim 1, wherein said wiper blade has opposite side walls having longitudinal grooves mortised along upper regions of said opposite side walls, and contact pressure springs located in said longitudinal grooves.

6. A washing installation according to claim 1, further comprising a plug-in connector arranged between said wiper arm and said retainer means, said supply line extending along said wiper arm and being connected with said channel within said wiper blade beneath said plug-in connector.

7. A washing installation for windshields of motor vehicles, aircraft and locomotives, said washing installation comprising:

a wiper arm;

a motor connected to said wiper arm for driving same;

a wiper blade having a central longitudinal plane and a predetermined length, attachable to said wiper arm, and including channel having outlet apertures;

retainer means for attaching said wiper blade to said wiper arm;

wherein said wiper blade further includes a wiper blade portion facing a windshield and forming a part of a wall of said channel into which said outlet apertures are mortised, two boundary lips projecting therefrom toward the windshield along opposite sides of the channel wall part, a wiper lip extending from said blade portion in the central longitudinal plane of said wiper blade between said boundary lips, said outlet apertures being located between respective sides surfaces of said boundary lips, and a swivel strip extending in the central longitudinal plane of said wiper blade for connecting said wiper lip to said channel wall part, said two boundary lips extending from said blade portion a distance which is less than a combined height of said swivel strip and said wiper lip; and wherein said washing installation further includes a water reservoir having a pump, a spray nozzle, an evaporator having an inlet and an outlet, first and second reversing valves, a first connecting line extending between said first reversing valve and said reservoir, second and third connecting lines, extending between said first reversing valve and said inlet of said evaporator and said second reversing valve, respectively, a fourth connecting line extending between said outlet of said evaporator and said second reversing valve, and fifth and sixth connecting lines extending between said second reversing valve and said nozzle and said wiper blade channel, respectively.

8. A washing installation according to claim 7, further comprising a first check valve located in said sixth connecting line.

9. A washing installation according to claim 8, further comprising a second check valve located in said second connecting line.

10. A washing installation according to claim 7, further comprising a pressure relief valve for said evaporator.

11. A washing installation according to claim 7, wherein said evaporator includes a first heating member for heating water, and second heating member for evaporating the water.

12. A washing installation according to claim 11, further comprising a pressure switch for switching said driving motor on, and control means for controlling operation of said drive motor, a pump motor, first and second heating members of said evaporator, and said pressure switch.

13. A washing installation according to claim 7, wherein said evaporator includes a steam spaced with a quick acting evaporator.

14. A washing installation according to claim 7, further comprising a pressure switch for switching was driving motor on and located in said sixth connecting line.

* * * * *